United States Patent [19]
Hollander

[11] 3,747,728
[45] July 24, 1973

[54] MAGNETICALLY ACUATED MECHANICAL POSITIONING APPARATUS

[76] Inventor: Kurt W. Hollander, P.O. Box 693, Annapolis, Md. 21404

[22] Filed: Dec. 9, 1971

[21] Appl. No.: 206,281

[52] U.S. Cl. ........ 192/58 A, 192/84 R, 192/84 PM, 310/14, 335/306, 416/164, 416/167
[51] Int. Cl. ...................... F16d 35/00, B64c 11/32
[58] Field of Search........... 192/58 A, 84 R, 84 RM; 416/164, 167, 157; 310/14, 23, 30; 335/220, 302, 306

[56] References Cited
UNITED STATES PATENTS

| | | | |
|---|---|---|---|
| 3,462,666 | 8/1969 | Martinek | 310/30 X |
| 2,032,966 | 3/1936 | Yoxall | 192/58 A |
| 849,719 | 4/1907 | Blair | 416/167 |
| 1,665,743 | 4/1928 | Knapp | 192/58 A |
| 1,071,847 | 9/1913 | Wilson | 310/14 X |
| 1,957,183 | 5/1934 | Schmitthenner | 416/157 |
| 2,400,186 | 5/1946 | Armentrout | 192/58 A |
| 3,228,500 | 1/1966 | Hollander | 192/58 A |

*Primary Examiner*—Allan D. Herrmann
*Attorney*—Norman H. Stepno and George J. Neilan

[57] ABSTRACT

Apparatus is provided for mechanically variably positioning a work member by means of a magnetic field. The member is connected to a control rod composed of a non-magnetic material and having a magnetic terminus. This rod is axially movably located within an interior bore of a rotatable shaft which is likewise connected to the work member. A movable magnet located exteriorly of the shaft creates a magnetic field, and movement of the magnet causes the magnetic terminus of the rod to move in a like direction which results in a corresponding movement or positioning of the work member. The apparatus is especially suitable for work devices requiring a rotating shaft to enter a fluid filled casing, e.g., a hydraulic power transfer device. It can also be used in any device where mechanically actuated movement is disadvantageous.

9 Claims, 5 Drawing Figures ns
MAGNETICALLY ACUATED MECHANICAL POSITIONING APPARATUS

BACKGROUND OF THE INVENTION

In any mechanical device involving closely spaced components which move relative to each other, use of mechanical linkages has inherent drawbacks due to the necessity of a great number of moving parts, which increases the possibility of failure and which usually results in a weakening of the main work bearing component. Not only is friction created which reduces the effectiveness of the work output; but, because of the friction involved in mechanical linkages, there is a tendency for the linkages to wear out and become less effective for their prime purpose, i.e., moving or positioning the work member.

There is described in my U.S. Pat. No. 3,228,500 a variable fluid shear clutch which provides improved power transfer in a range of maximum slippage to maximum torque. While the device described has been found to effectively operate in the manner intended, difficulties have been encountered in operation due to the fact that flexible seals are required for the mechanical means for retracting and extending the output shaft vanes, which are located within a casing containing a viscous fluid. As a consequence, unless these seals are extremely tight fitting, leakage occurs, and after repeated usage it has been found that most seals tend to fail.

It is therefore an object of this invention to provide apparatus for mechanically variably positioning a work member by means involving a minimum of mechanical linkages.

It is a further object of this invention to provide apparatus for positioning mechanical members by means of a magnetic field.

It is a still further object of this invention to provide an apparatus for varying the torque between an input element and an output element by means of magnetic positioning of the work member. These and other objects will become apparent from the description which follows:

BRIEF DESCRIPTION OF THE INVENTION

Briefly, in accordance with this invention there is provided an apparatus for positioning a work member which comprises a control rod and a shaft each of which is connected to a work member, the rod being positioned within an interior slot, or concentric bore, in said shaft. The terminus of said control rod opposite said work member is composed of a magnetic material and the rod is axially movably positioned within the shaft. Exteriorly of the shaft there is provided a movable magnetic field. Variations in the positioning of the magnetic field cause the control rod to move in like manner thereby causing a mechanical repositioning of the work piece. In operation of the apparatus of this invention no mechanical contact is required between the field source, i.e., the movable magnetic field, and the member which mechanically positions the work piece. Thus, little if any friction is involved and even if fluid is required to be present within the bore of the shaft, no flexible seals are required.

DETAILED DESCRIPTION OF THE INVENTION

The invention will be more clearly understood with reference to the accompanying drawings.

Figure 1:
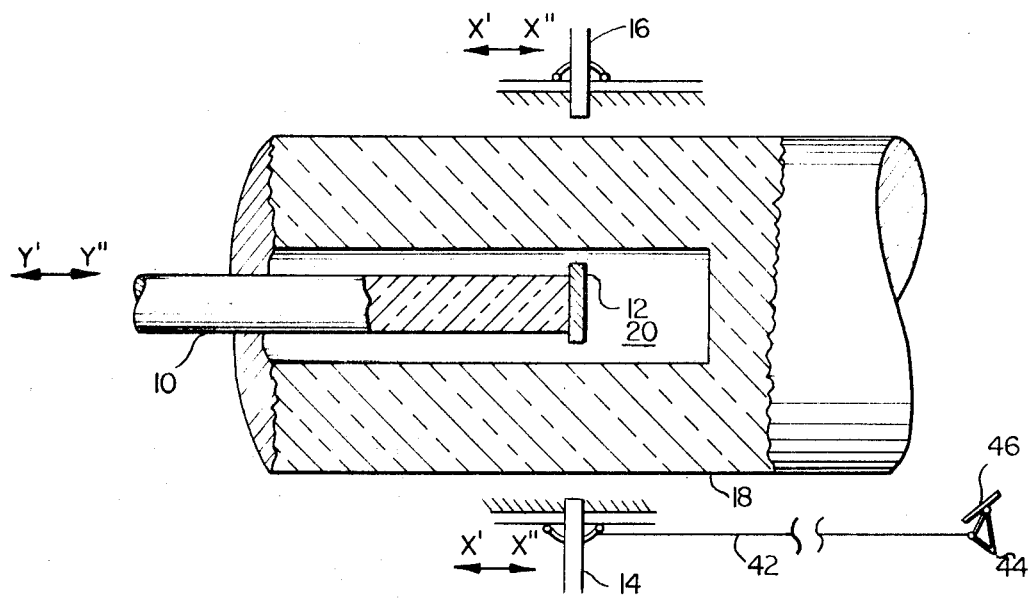
FIG. 1 is a side view, partly in section, of a portion of the apparatus of this invention.

Referring to FIG. 1, a control rod 10 which is connected to a work member (not shown) is movably located within an interior slot, or concentric bore 20 of a shaft 18. The terminus of rod 10 within the slot 20 is composed of a magnetic material 12. This magnetic material may be welded onto the end of shaft 10 or connected in any other suitable manner. Located exteriorly of the shaft 18 are movable magnets 14 and 16. The magnetic field created by magnets 14 and 16 are directed towards the magnetic terminus 12 of rod 10. Of course for effective operation of the apparatus of this invention, shaft 18 and the remainder of rod 10 should be non-magnetic so as to avoid interference with the magnetic field created by magnets 14 and 16. Longitudinal or axial movement of magnets 14 and 16 will cause a like movement of rod 10 via its magnetic terminus 12, which in turn causes a repositioning or movement of the work piece connected to the other end of rod 10 (not shown). Movement of magnets 14 and 16 may be accomplished by any suitable means such as pivot linkages 44 and a link 42 associated with a foot pedal 46 of a motor vehicle.

Figure 2:
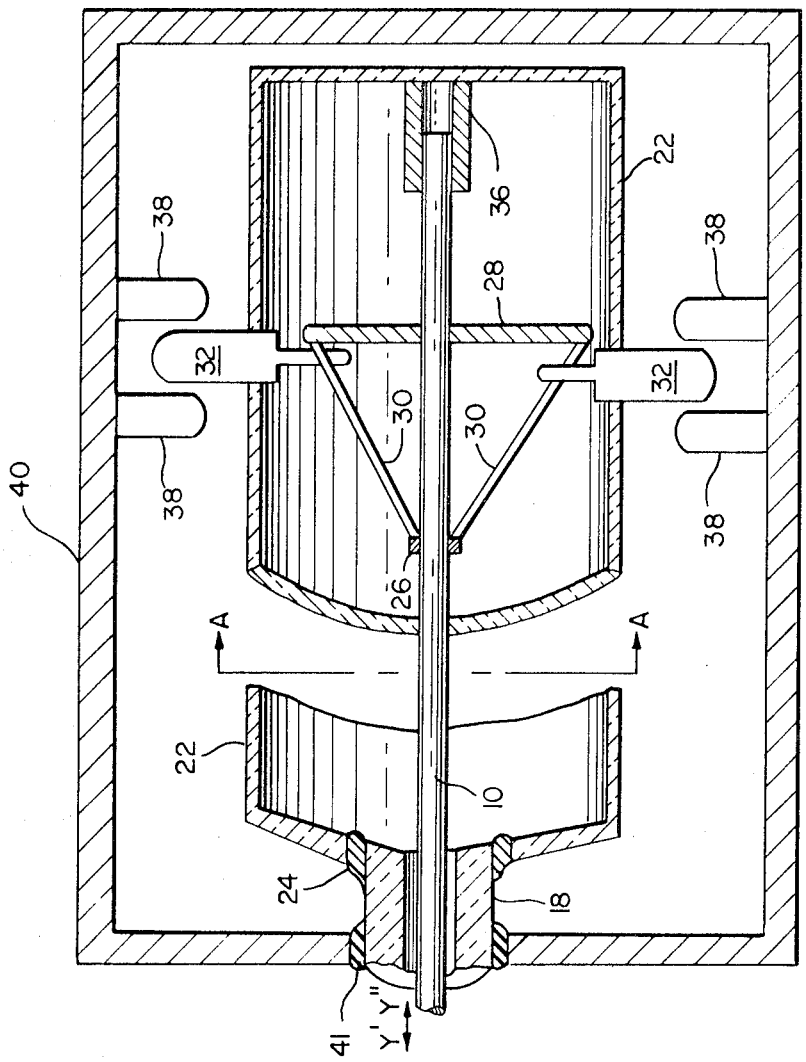
FIG. 2 is a sectional view of the connection of the apparatus of this invention to a work member, i.e., a variable fluid shear clutch.

In FIG. 2 there is depicted the connection of rod 10 and shaft 18 to a work member, in this case a variable torque transfer apparatus which hydraulically transfers power from an input shaft to an output shaft which is given a torque variable over a predetermined range. As shown in FIG. 2, input shaft 18 having rod 10 located interiorly thereof enters liquid filled casing 40 through a seal bushing 41. An input drum 22 is attached to the end of shaft 18 by a weld 24. Control rod 10 extends into drum 22, through ring 26 and radial spokes 28, and into support means 36 in which it is slidably mounted. Shaft 10 is fixedly secured to the ring 26 and the radial spokes 28 whereby movement of the shaft will cause a like movement of the ring and spokes. Slanted bars 30 are connected to spokes 28 and ring 26.

Figure 2A:
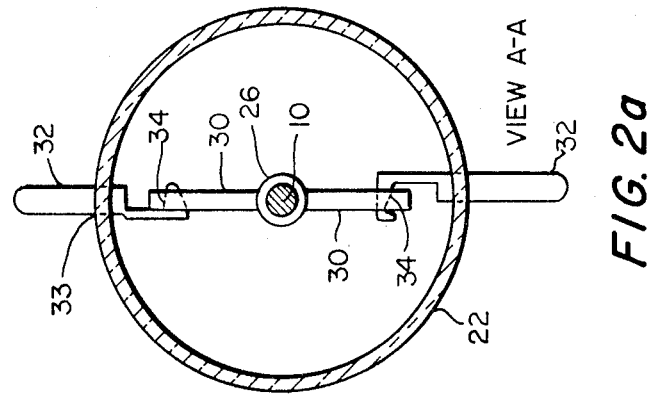
FIG. 2a is a sectional view of FIG. 2 along line A—A.

The input drum 22 has a plurality of movable vanes 32, which may be, e.g., spoon shaped, arcuate or flat, extending through it in spaced apart rows. The vanes 32 are connected to slanted bars 30 via notches 34, shown more clearly in FIG. 2a, and the vanes 32 may be retracted or extended by movement of radial spokes 28 and bars 30 via rod 10. Thus, as rod 10 moves inwardly into casing 22, i.e., to the right as seen in FIG. 2, the vanes 32 are retracted and conversely, as rod 10 is withdrawn to the left, the vanes 32 are extended.

The vanes 32 are restrained from movement in axial directions by providing very close tolerances in the openings 33 located in drum 22. Thus, movement of the magnetic field by means of magnets 14 and 16 (FIG. 1) will cause movement of rod 10 to retract or extend vanes 32 as desired.

Power is transmitted to the casing 40 by means of fixed output vanes 38 located on the interior wall thereof.

It will be understood that while only two input vanes 32, two slanted bars 30, and two radial spokes 28 are shown for purposes of clarity, it is within the scope of this invention, and indeed in most cases preferred, to provide additional spokes and slanted bars which have a plurality of vanes 32 extending from drum 22. Likewise, while only four fixed output vanes 38 are depicted in the drawings, it will again be understood that the interior of casing 40 will have a greater number of such stationary vanes.

When casing 40 is filled with a suitably viscous liquid, the rotation of the drum 22 causes the vanes 32 to set the liquid in motion. In operation, when the vanes 32 are fully extended they pass between the rows of fixed vanes 38 in close proximity to the interior surface of casing 40. Maximum coupling or power transfer between the input and output shafts is accomplished in this position in which the torque adjusting bars 30 are extended fully forward by means of rod 10. The viscous flow set up by the input vanes 32 causes the output vanes 38 to rotate the casing 40 which may be conveniently connected to a shaft (not shown).

When the torque adjusting control rod 10 is moved toward the rear portion of casing 40, the output vanes 32 are retracted thereby decreasing the power transfer. When the input vanes 32 are fully retracted so that their extremities are fully withdrawn from the exterior of drum 22 there is a minimum of power transfer. In this condition, the rotation of the input drum 22 does not appreciably effect the output because there is no exposed input vane elements to cause a rapid viscous flow. Consequently, virtually complete slippage is obtained when the vanes 32 are fully retracted.

Figure 3:
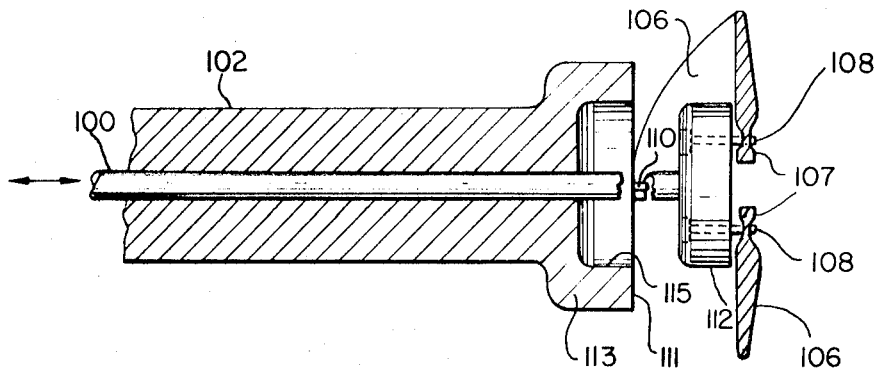
FIG. 3 is a sectional view of another application of the apparatus of this invention, i.e., means to change the pitch of rotor blades.
Figure 3A:
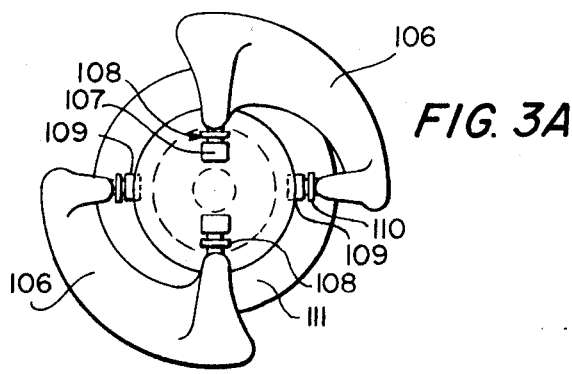
FIG. 3a is an end view of the FIG. 3 embodiment.

FIGS. 3 and 3a depict a further application of the device of the apparatus of this invention for changing the pitch of rotor blades. A control rod 100, which is movable in a manner as depicted in FIG. 1 with regard to rod 10 via the magnetic field produced by magnets 14 and 16, is movably mounted with a sliding fit within the axial bore of a rotatable rotor drive shaft 102. The rod 100 terminates in an enlarged head 112. Rotor blades 106, for example, the blades of a ship's screw, are attached to the head 112 and drive shaft 102 via pivot pins 107 and 109, which are rotatably fastened in eyelets 108 and 110, respectively. The eyelets 110 are attached to the annular face 111 of the enlarged end 113 of drive shaft 102. Movement of rod 100 via the magnetic field will cause a change in the pitch or angle of the blades 106. Thus, the setting of the rotating ship's screw can be accomplished without appreciably weakening the main shaft which would be necessary when mechanically controlled rods are inserted therein. The head 112 may be moved into the recess 115 in the end 113 of the drive shaft when zero pitch, neutral setting, of the blades is desired. That is, no clutch is required.

Obviously many modifications and variations of the present invention are possible in light of the above teachings. It is therefore to be understood that many changes are permissible within the scope of the appended claims.

What is claimed is:

1. Apparatus for varying the torque between a driven input element and an output element which comprises (a) a chamber filled with viscous fluid and having a first plurality of vanes extending from the interior wall thereof, (b) a rotatable drum within said chamber having a plurality of radially movable vanes extending therefrom into operative relationship with said first plurality of vanes, (c) a control rod and a shaft extending into said chamber, said shaft being rotatable and connected to said drum, said rod being axially movably located within a concentric opening provided in said shaft and extending into said drum in connecting relationship to said movable vanes, (d) a terminus of said rod within said second shaft being composed of a magnetic material, and (e) movable magnet means exterior of said shaft for creating a magnetic field whereby upon movement of said magnetic field said control rod moves in a like direction causing in turn radial movement of said movable vanes.

2. Apparatus as defined in claim 1, wherein said movable vanes are connected to said rod inside said drum by means of slanting members, and said rod, upon being magnetically moved, causes said slanting members to move resulting in extension or retraction of said radially movable vanes.

3. Apparatus for positioning a work member comprising a hollow, rotatable, driven shaft connected to the work member, a control rod disposed within said shaft and being axially movable therein, said control rod having a terminal portion composed of a magnetic material and located within said shaft, movable magnet means located exteriorly of said shaft for creating a magnetic field, and adjustment means to controllably move the magnet means in the longitudinal direction of the shaft so that movement of the magnetic field causes a corresponding movement of the control rod, said adjustment means being effective to prevent further longitudinal movement of the magnet means when a selected positioning of the work member has been achieved and to maintain the magnet means in this position during normal operation of the work member until the work member is to be subsequently repositioned.

4. Apparatus according to claim 3, wherein the work member is a variable fluid shear clutch including a plurality of movable vanes rotated by said shaft, and wherein said adjustment means are effective to reverse the pitch of said vanes and in one position thereof to adjust the pitch of said vanes to a neutral position.

5. Apparatus according to claim 3, wherein the work member is a propulsion system for a vehicle comprising an assembly of adjustable pitch rotor blades positioned exteriorly of the vehicle within the ambient medium through which the vehicle moves.

6. Apparatus according to claim 3, wherein for dynamic stability and mechanical strength the cylindrical surface of said shaft is uninterrupted and the thickness of said shaft is substantially uniform throughout its length.

7. Apparatus according to claim 3, wherein the magnet means comprise a plurality of magnets spaced radially outwardly from and out of contact with said shaft, and said magnets being movable in unison.

8. Apparatus according to claim 3, wherein said work member comprises an assembly of adjustable pitch rotor blades, and means connecting said blades to said shaft and to said control rod to permit pitch adjustment.

9. Apparatus according to claim 8, wherein said shaft has an enlarged end provided with a recess therein of greater size than the opening through which said control rod extends, said blades being connected to said enlarged end of said shaft, a head disposed on said control rod and adjustably connected to portions of said blades, said head having a configuration to enable it to fit into the recess in the enlarged end of said shaft.

* * * * *